United States Patent Office 3,309,325
Patented Mar. 14, 1967

3,309,325
PREPARATION OF AN ANTIMONY OXIDE-TIN OXIDE CATALYST COMPOSITION AND THE PRODUCT THEREOF
Edward James Gasson, Epsom Downs, Surrey, and David Gordon Stewart, Epsom, Surrey, England, assignors to The Distillers Limited, Edinburgh, Scotland, a British company
No Drawing. Filed Mar. 12, 1964, Ser. No. 351,517
Claims priority, application Great Britain, Apr. 5, 1963, 13,575/63
6 Claims. (Cl. 252—461)

The present invention relates to a catalytic composition and in particular to a catalytic composition for use in oxidation reactions.

British Patent No. 904,602 describes and claims a catalytic composition which comprises antimony tetroxide in combination or in admixture with stannic oxide. This composition may be regarded either as a mixture of antimony tetroxide with stannic oxide or as a compound of antimony, tin and oxygen; under the reaction conditions either or both forms may be present in the catalyst. According to the patent the composition may be prepared by heating at a temperature in the range 550° to 1100° C. in the presence of oxygen a mixture comprising an oxide of antimony or the hydrated oxide of antimony obtained by the action of aqueous nitric acid on antimony metal with an oxide of tin or the hydrated oxide of tin produced by the action of aqueous nitric acid on tin metal, or a mixture of tin and antimony oxides in which either the tin or antimony oxide or both are formed by hydrolysis of a cationic salt of the metal. In a particular embodiment described in this patent the catalyst is prepared by digesting tin and antimony metals in separate baths of nitric acid, combining the resulting mixtures followed by washing and drying the resulting precipitate, pelleting and heat treating at 500° to 1100° C.

It has now been found according to the present invention that by employing a particular method for the preparation of the catalyst the homogeneity of the catalyst can be improved, and that the increase in homogeneity results in an improved catalyst performance. It is believed that this may be due to a reduction of the segregation of the constituents during subsequent treatment e.g. pelleting or storage and to the elimination of both the coarser and the very fine particles, thereby facilitating the filtration of the catalyst suspension during preparation, and the pelleting of the dried catalyst. The activity of catalysts prepared by this particular method varies less from batch to batch.

Accordingly the present invention is a catalytic composition comprising essentially antimony tetroxide in combination or in admixture with stannic oxide prepared by successively adding tin and antimony metals to an aqueous solution of nitric acid and heat-treating the resulting precipitate at 550° to 1100° C. in the presence of molecular oxygen.

In a preferred method of preparation of the catalyst powdered tin metal is reacted with a stoichiometric excess of aqueous nitric acid at an elevated temperature, preferably in the range 80° to 100° C. Powdered antimony metal is then added to the mixture, suitably maintained at a temperature between 80° C. and the boiling point of the mixture. The resulting precipitate is then washed at least twice, one washing at least involving contacting the precipitate with boiling water, for instance for about one hour, the supernatant liquid being decanted or filtered off between washings. Preferably the precipitate is washed first with cold water then contacted with boiling water for about one hour, and finally washed again with either hot or cold water. The washed precipitate is finally isolated by filtration and is dried. The catalyst is then admixed with a suitable lubricant e.g. graphite and the mixture pelleted, the pellets being finally heated to a temperature in the range 550° to 1100° C. in the presence of molecular oxygen.

The initial concentration of the aqueous nitric acid may suitably range from 5 to 55% by weight of $HNO_3$ and preferably from 15 to 30% $HNO_3$. In a further preferred embodiment after the addition of tin metal the concentration of nitric acid in the mixture is increased to above 30% by weight of $HNO_3$ (preferably above 40% $HNO_3$), before the addition of the antimony metal.

Reactions in which the tin/antimony catalyst is of particular value include the oxidation of propylene to acrolein, the oxidative dehydrogenation of butene to butadiene, the conversion of propylene and/or acrolein to acrylonitrile and isobutene and/or methacrolein to methacrylonitrile by reaction with molecular oxygen and ammonia and the conversion of methanol to hydrogen cyanide also by reaction with molecular oxygen and ammonia.

Methods of preparing the catalytic composition of this invention and of its use in oxidation reactions are further illustrated with reference to the following examples in which all parts are parts by weight.

Example 1

59.3 parts of powdered tin were fed over a period of 10 minutes to a stirred mixture of 500 parts of water and 370 parts of concentrated nitric acid (68%) at 100°; 1420 parts of concentrated nitric acid (68%) were then added and the mixture heated to 103° C. 243.5 parts of powdered antimony were then introduced during 20 minutes, the mixture boiled for a further 7 minutes (111° C.) cooled to 40° C. and filtered. The solid was stirred with 1500 parts of cold water for 15 minutes, filtered, then boiled with 2000 parts of water for one hour, cooled to 40° C., filtered and finally stirred with 1500 parts of cold water for 5 minutes.

The filtered cake was dried in an oven at 140° C. The sieve analysis of the oxide mixture was as follows:

| BSS sieve sizes: | Percentage of oxide mixture |
|---|---|
| Larger than 100 mesh | 0.1 |
| 100–200 | 5.5 |
| 200–325 | 15.0 |
| 325–400 | 67.4 |
| Finer than 400 | 12.0 |

In comparison, catalysts produced by attack of the tin and antimony in separate baths, had the following sieve analyses:

|  | Catalyst A, percent | Catalyst B, percent |
|---|---|---|
| Larger than 100 mesh | 37.4 | 8.8 |
| 100–200 | 19.2 | 44.6 |
| 200–300 | 35.2 | 6.1 |
| Finer than 300 | 8.2 | 40.5 |

In each case the material coarser than 300 mesh contained only minor amounts of tin oxide.

The dried oxide mixture prepared according to our present application was mixed with graphite (1%), pelleted and heat-treated in air at a temperature which was progressively increased from 300° to 800° C. at 21°/hour, then maintained at 800° for 16 hours.

A gaseous mixture of propylene (5%), ammonia (6%), air (55%) and steam (34%) was passed over this catalyst at 480° C. and at 4 seconds contact time. The following yields (based on propylene fed) were obtained: acrylonitrile 60%, acrolein 1%, $CO_2$ 15%, and recovered propylene 4%.

Example 2

59.3 parts of powdered tin was added to a mixture of 500 parts of water and 370 parts of concentrated nitric acid (d. 1.42, 68%) at 100° under reflux, over a period of 30 minutes. 1420 parts of concentrated nitric acid were then added, the mixture heated to 110° under reflux, and 243.5 parts of antimony introduced during 40 minutes at the same temperature. The mixture was refluxed gently (113° C.) for 30 minutes, cooled to 40° and the supernatant liquid decanted. The residue was washed three times, each by stirring with 2000 parts of water and decanting the supernatant liquid. The first and third washes were in cold water (15 minutes) and the second in boiling water, for 1 hour. The washed precipitate was filtered, dried at 120–140° C. for 16 hours, then pelleted and heat-treated as in Example 1.

A mixture of propylene, air, steam and ammonia, was passed over the catalyst exactly as in Example 1. The following yields (based on propylene fed) were obtained; acrylonitrile—60%, acrolein—3%, $CO_2$—12% and recovered propylene—7.

Example 3

A catalyst was prepared in an open vessel as in Example 1, except that the temperatures were lower and the times of heating of the mixtures were reduced.

The tin was added to the dilute nitric acid at 80° C. over a period of 10 minutes, and the antimony at 95–100° over a period of 20 minutes. After the addition of the antimony the mixture was stirred at 100° for 12 minutes, cooled and washed by stirring three times with cold water, each for 15 minutes. The final filtrates were dried, pelleted and heat-treated as in the previous examples.

A mixture of propylene, ammonia, air and stream was passed over the catalyst at 480° and 4 seconds contact time (as described in Example 1). The following yields (based on propylene fed) were obtained: acrylonitrile 60%, acrolein 2%, $CO_2$ 14% and recovered propylene 3%.

Example 4

357 parts by weight of powdered tin were added during 30 minutes to a mixture of 3000 parts of water and 2130 parts of concentrated nitric acid stirred at 100° C. in an open stainless steel vessel. When the reaction had ceased 8520 parts by weight of concentrated ntric acid were added, the mixture heated to 108–110° C., and 1461 parts by weight of powdered antimony added during 80 minutes. The mixture was then boiled for one hour, cooled to 40° C. and filtered. The filter-cake was washed three times by stirring in 12000 parts of water for one hour; the first wash was carried out at room temperature, the second at 100° C. and the third at room temperature. The washed cake was dried at 80° for 60 hours, mixed with 1% of its weight of graphite and pelleted. The pellets were heated in a stream of air, from 300° to 800° in 25 hours, then maintained at 800° for 16 hours.

A mixture of propylene, ammonia, air and steam, passed over this catalyst as described in Example 1 at 479° C. and 4 seconds contact time, gave the following yields (based on propylene fed to the reactor): acrylonitrile 63%, acrolein 1%, hydrogen cyanide 6.6%, and carbon oxides 18%. The efficiency of conversion of propylene to acrylonitrile was 65%.

We claim:
1. A catalyst consisting essentially of a material selected from the group consisting of antimony tetroxide in combination with stannic oxide and antimony oxide in admixture with stannic oxide, said catalyst being prepared by the successive addition first of tin and then of antimony metals to an aqueous solution of nitric acid followed by heat treatment of the resulting precipitate at a temperature in the range 550 to 1100° C. in the presence of molecular oxygen.

2. A process for the preparation of a catalyst consisting essentially of a material selected from the group consisting of antimony tetroxide in combination with stannic oxide and antimony oxide in admixture with stannic oxide which comprises the successive addition first of tin and then of antimony metals to an aqueous solution of nitric acid and then heat treating the resulting precipitate at a temperature in the range 550 to 1100° C. in the presence of molecular oxygen.

3. A process as claimed in claim 2 wherein the initial concentration of the aqueous solution of nitric acid ranges from 5 to 55% by weight of $HNO_3$.

4. A process as claimed in claim 3 wherein the initial concentration of the aqueous solution of nitric acid ranges from 15 to 30% by weight of $HNO_3$.

5. A process as claimed in claim 2 which comprises the addition of tin metal to a stoichiometric excess of aqueous nitric acid at a temperature in the range 80 to 100° C. followed by the addition of antimony metal to the mixture at a temperature between 80° C. and the boiling point of the mixture followed by washing of the resultant precipitate with water at least twice, one washing using boiling water, drying and pelleting the precipitate and heating the resultant pellets to a temperature in the range 550 to 1100° C. in the presence of molecular oxygen.

6. A process as claimed in claim 5 wherein the concentration of the aqueous solution of nitric acid after the addition of the tin metal and before the addition of antimony metal is increased to above 30% by weight of $HNO_3$.

References Cited by the Examiner

UNITED STATES PATENTS

| | | | |
|---|---|---|---|
| 3,094,552 | 6/1963 | Wood | 252—461 X |
| 3,094,565 | 6/1963 | Bethell et al. | 252—461 X |
| 3,149,914 | 9/1964 | Bellringer et al. | 252—461 X |
| 3,152,170 | 10/1964 | Barclay et al. | 252—461 X |
| 3,197,419 | 7/1965 | Callahan et al. | 252—461 X |
| 3,198,751 | 8/1965 | Bethell et al. | 252—461 |
| 3,210,295 | 10/1965 | Modiano | 252—461 |

OSCAR R. VERTIZ, *Primary Examiner.*

G. OZAKI, *Assistant Examiner.*